United States Patent Office 2,872,484
Patented Feb. 3, 1959

2,872,484

PREPARATION OF TETRAALKYL-ISOTHIOUREAS

Hans Z. Lecher, Plainfield, and Elizabeth M. Hardy, Bound Brook, N. J., assignors to American Cyanamid Company, New York, N. Y., a corporation of Maine No Drawing. Application May 21, 1956
Serial No. 585,921

4 Claims. (Cl. 260—564)

This invention relates to a novel process for preparing tetraalkylisothioureas, corresponding to the general formula:

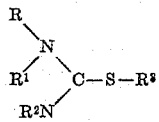

in which R, R$^1$, R$^2$, and R$^3$ respectively, stand for the same or different alkyl groups of from 1 to 2 carbon atoms. More particularly, it relates to the alkylation of N,N,N'-trialkylthioureas in an aqueous, strong non-oxidizing acid medium.

It is known that S-alkylisothioureas can be prepared by the S-alkylation of thioureas. In the alkylation of unsubstituted thioureas, reaction proceeds with ease. For example, the S-methylation of thiourea can be easily accomplished by refluxing thiourea with methanol and concentrated hydrochloric acid. One explanation for this ease in S-alkylation resides in the fact that thiourea is highly polar and possesses a salt-like Zwitter ion structure.

However, as the hydrogens of the amino radical in the thiourea molecule are successively replaced by alkyl, the polarity of the so-substituted thiourea sharply decreases. Consequently, the S-alkylation of N,N,N'-trialkylthioureas, for instance, is not accomplished with ease but proceeds only with great difficulty. In addition, the use of highly polar alkylating agents cannot be satisfactorily employed, because when a tetraalkylisothiourea product is made that product is usually found to be contaminated with tetraalkylureas and alkylmercaptans. Generally, however, tetraalkylureas are difficult to separate from the desired tetraalkylisothiourea product because the boiling points of tetraalkylureas and tetraalkylisothioureas are very close, if not the same. Further, the presence of alkylmercaptans renders any distillation of the tetraalkylisothioureas extremely difficult, because excessive foaming occurs. To the present, a commercially satisfactory process for the preparation of tetraalkylisothioureas free from substantial quantities of impurities has not been developed.

The principal object of this invention, therefore, is to provide a novel improved method for the preparation of tetraalkylisothioureas. It is a further object of the invention to prevent the formation of alkylmercaptans and tetraalkylureas as impurities. It is a still further object of the invention to devise a process for alkylating trialkylthioureas so as to obtain a readily distillable product from which a good yield of substantially pure tetraalkylisothiourea can be recovered.

To this end, it is proposed to alkylate N,N,N'-trialkylthioureas with a high polar dialkyl sulfate alkylating agent, for example, dimethyl or diethyl sulfate, in an aqueous medium. It is further proposed to employ simultaneously therewith a strong non-oxidizing acid. In this manner, the objects of the present invention have been successfully attained.

Although it is not proposed to restrict an explanation of the invention to any particular theory, it is believed that during alkylation but in the absence of a strong non-oxidizing acid, pentaalkylthiouronium salts are formed and the latter are hydrolyzed to tetraalkylureas and alkylmercaptans in the presence of alkali, such as sodium hydroxide, represented by the following general reaction:

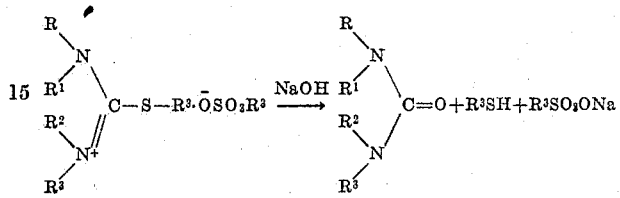

wherein R, R$^1$, R$^2$, and R$^3$ are defined above. However, by providing a strong non-oxidizing acid according to the present invention, it is found that pentaalkylthiouronium salts are not formed during alkylation. Resultant high yield and purity of N,N,N',S-tetraalkylisothioureas are thereby assured.

The temperature of the alkylation reaction is not critical. Advantageously, it is carried out at room temperature or below.

Although any highly polar dialkyl sulfate reagent can be used, it is found that dimethyl sulfate and diethyl sulfate are preferred. In general, equivalent amounts of both the alkylating and the trialkylthiourea reactants are contemplated. However, it is advantageous to employ an excess of the alkylating agent for best results.

The acidified aqueous medium, employed as the liquid vehicle during alkylation, contemplates a wide variety of strong non-oxidizing acids. Illustrative of the latter are: sulfuric acid, p-toluene sulfonic acid, hydrochloric acid, phosphoric acid, oxalic acid and trichloroacetic acid. Although the amount used and the concentration employed of the acid are not critical, nonetheless these should be sufficient to provide a pH of about 1 or less. Sulfuric acid is the preferred acidic reagent, because it is readily available and relatively inexpensive. Additionally, it tends to inhibit the hydrolysis of the alkylating agent.

Tetraalkylisothioureas prepared as described above are useful reagents for the preparation of polyalkylated guanidines. For examples, according to the process disclosed and claimed in a copending application, Serial No. 585,939, filed on even date, tetramethylisothiourea is reacted with chlorine in the presence of carbon tetrachloride to form C-chloro-N,N,N'-trimethylformamidine hydrochloride. The latter can be converted to pentaalkylguanidines with dialkylamines in the presence of an inert, anhydrous diluent. Pentaalkylguanidines as disclosed in a copending application, Serial No. 585,972, filed on even date, are excellent acid binders as well as good solvents for difficultly soluble organic compounds, such as anthraquinone.

To facilitate a further understanding of the present invention, the following examples are presented for purposes of illustrating the invention and are not intended to be limitative. Unless otherwise stated, the parts are by weight.

EXAMPLE 1

*N,N,N',S-tetramethylisothiourea preparation*

37.8 parts of dimethyl sulfate is slowly added to an agitated slurry of 23.6 parts of N,N,N'-trimethylthiourea in 112 parts of 18% sulfuric acid to maintain the reaction mass at a pH of below about 1. The temperature is kept at about 20° C. by cooling. The mixture is stirred until the reaction is complete. Then a solution of 40 parts of sodium hydroxide in 50 parts of water is added. An oily layer of the isothiourea collects on top and is separated. An additional amount of desired isothiourea product is extracted from the aqueous layer with benzene, although diethyl ether or any suitable water-immiscible solvent can be substituted for benzene with equally good results. Fractional distillation of the recovered upper layer and extract gives a yield of about 85% of pure N,N,N',S-tetramethylisothiourea, substantially free from impurities, and having a boiling point of 68° C. at 11 mm. Hg pressure.

kylating agents are used as indicated in the following table:

| Run | $RR^1N\overset{S}{\overset{\|}{C}}NHR^2$ Reactant | $(R^3)_2SO_4$ Alkylating Agent | Resultant Product | B. P. in ° C. and mm. Hg Pressure |
|---|---|---|---|---|
| 5 | R=methyl<br>R¹=ethyl<br>R²=methyl | R³=methyl | N-ethyl-N,N',S-trimethylisothiourea | 79°–80° C./18 mm. |
| 6 | R=methyl<br>R¹=methyl<br>R²=methyl | R³=ethyl | S-ethyl-N,N,N'-trimethylisothiourea | 79°–82° C./18 mm. |
| 7 | R=methyl<br>R¹=ethyl<br>R²=ethyl | R³=methyl | N,N'-diethyl-N,S-dimethylisothiourea | 80° C./13 mm. |
| 8 | R=ethyl<br>R¹=ethyl<br>R²=methyl | R³=methyl | N,N-diethyl-N',S-dimethylisothiourea | 79°–80° C./10-11 mm. |
| 9 | R=methyl<br>R¹=methyl<br>R²=ethyl | R³=methyl | N'-ethyl-N,N,S-trimethylisothiourea | 69.2°–69.5° C./12 mm. |
| 10 | R=ethyl<br>R¹=ethyl<br>R²=ethyl | R³=methyl | N,N,N'-triethyl-S-methylisothiourea | 85° C./12 mm. |

EXAMPLE 2

The procedure of Example 1 is followed but is modified to the extent that the sulfuric acid is replaced by 120 parts of water. A 31% recovery of impure N,N,N',S-tetramethylisothiourea is obtained.

EXAMPLE 3

Again repeating the procedure of Example 1, but substituting an equivalent amount (i. e., 25.2 parts) of dimethyl sulfate for the 37.8 parts of dimethyl sulfate therein, a somewhat reduced yield of pure tetramethylisothiourea (about 81%) is obtained.

EXAMPLE 4

Following the procedure of Example 3 but substituting 120 parts of water for the acid, a 73% yield of impure N,N,N',S - tetramethylisothiourea is obtained. The latter isothiourea is heavily contaminated by N,N,N',N'-tetramethylurea. Further fractional distillation proved difficult because of excessive foaming.

EXAMPLES 5–10

In the following runs, the procedure of Example 1 is repeated in every material detail except that several different N,N,N'-trialkylthioureas and dialkyl sulfate al-

We claim:

1. In a process for preparing (lower)alkylisothioureas in which a N,N,N'-tri(lower)alkylthiourea, said alkyl substituents containing from one to two carbon atoms, is reacted with a dialkyl sulfate in an aqueous medium and the corresponding tetraalkylisothiourea is recovered, the improvement in combination therewith which comprises: carrying out the alkylation step in the presence of cold aqueous sulfuric acid at a temperature not greater than about 20° C. to recover substantially pure N,N,N',S-tetraalkylisothiourea.

2. A process according to claim 1 in which the alkylating agent is dimethyl sulfate.

3. A process according to claim 1 in which the alkylating agent is diethyl sulfate.

4. In a process for preparing N,N,N',S-tetramethylisothiourea which comprises alkylating N,N,N'-trimethylthiourea with dimethyl sulfate in an aqueous medium and recovering said tetraalkylisothiourea, the improvement in combination therewith which comprises: carrying out the alkylation step in the presence of cold aqueous sulfuric acid at a temperature not greater than about 20° C. until the reaction is substantially complete, adding sufficient sodium hydroxide to the reaction mixture in order to form two layers, separating the upper layer from the lower layer, extracting the lower layer with a water-immiscible inert organic solvent, fractionally distilling said upper layer and extract, and recovering therefrom substantially pure N,N,N',S-tetramethylisothiourea.

References Cited in the file of this patent

Parker et al.: Mellor's Modern Inorganic Chemistry (1947), Longmans Green and Co.

Lecher et al.: Annalen (1924).

Holleman: Text Book of Inorganic Chemistry (1907), John Wiley and Sons.